2 Sheets--Sheet 1.

J. B. WEBSTER, W. A. DORR & M. McCLENATHAN.
Harvesters.

No. 150,114. Patented April 21, 1874.

Witnesses,
John L Boone
O. Milton Richardson

Inventors,
Joshua B Webster
William A Dorr
Martin McClenathan
by Dewey & Co Attys.

2 Sheets--Sheet 2.
J. B. WEBSTER, W. A. DORR & M. McCLENATHAN.
Harvesters.
No. 150,114.        Patented April 21, 1874.
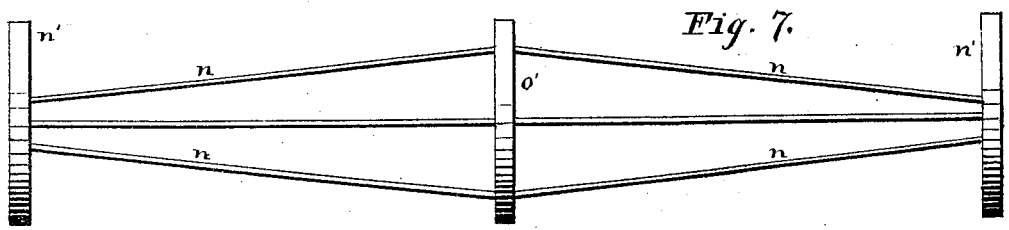
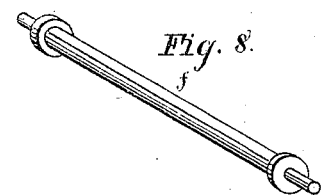
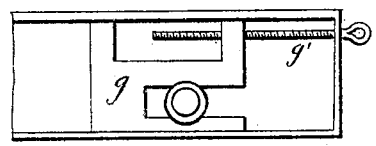
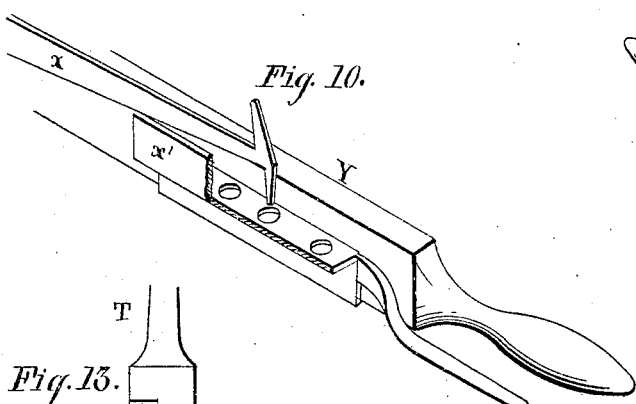
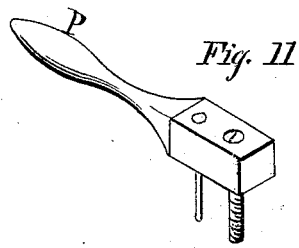
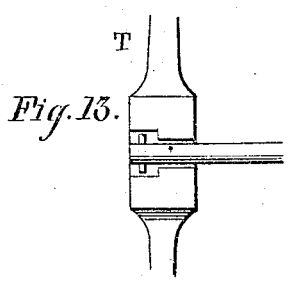
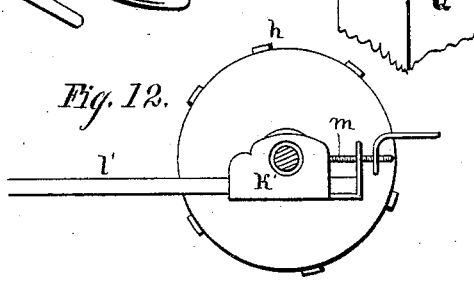
Witnesses,        Inventors,
John L. Boone.      Joshua B. Webster.
C. Milton Richardson.    William A. Dorr.
                          Martin McClenathan.
                          by Dewey & Co. Attys.

UNITED STATES PATENT OFFICE.

JOSHUA B. WEBSTER AND WILLIAM A. DORR, OF STOCKTON, AND MARTIN McCLENATHAN, OF MERCED, CALIFORNIA.

IMPROVEMENT IN HARVESTERS.

Specification forming part of Letters Patent No. 150,114, dated April 21, 1874; application filed December 15, 1873.

*To all whom it may concern:*

Be it known that we, JOSHUA B. WEBSTER, and WILLIAM A. DORR, of Stockton, California, and MARTIN McCLENATHAN, of Merced, Merced county, State of California, have invented a Single-Gear Header; and we do hereby declare the following description and accompanying drawings are sufficient to enable any person skilled in the art or science to which it most nearly appertains to make and use our said invention without further invention or experiment.

Our invention relates to certain improvements in that class of agricultural implements known as headers; and it consists in the combination and arrangement of certain parts, as hereinafter explained, and pointed out in the claims.

Figure 1:
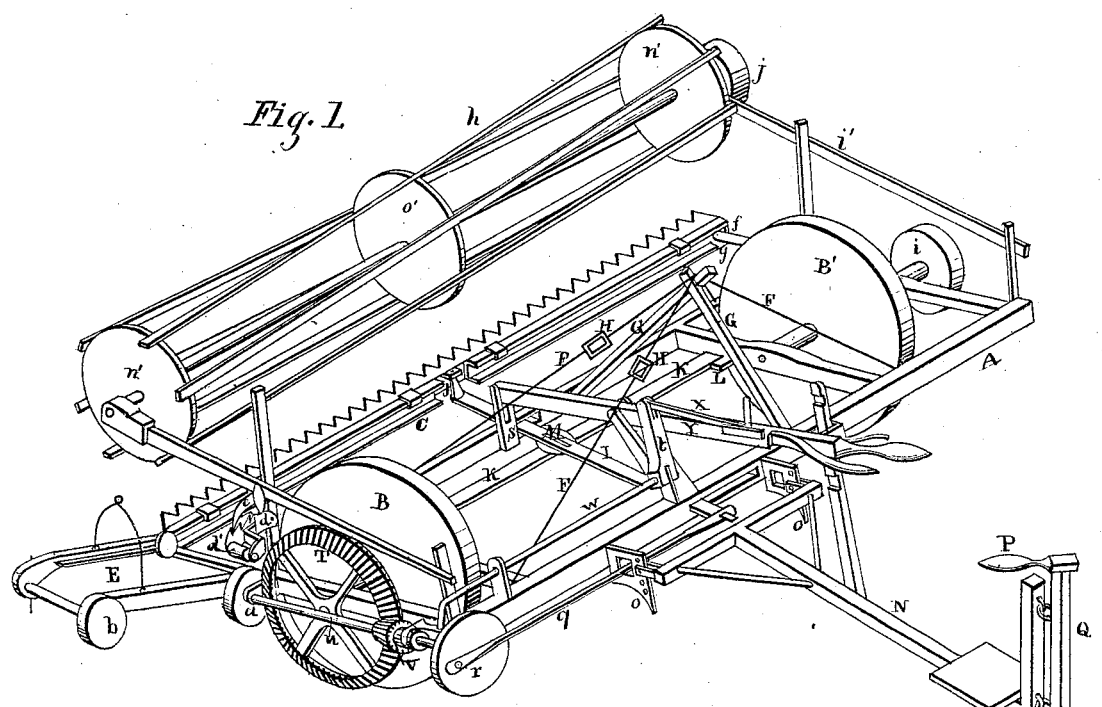
Figure 2:
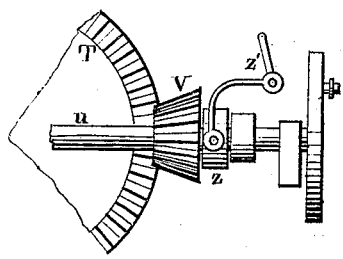
Figure 3:
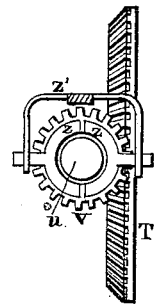
Figure 4:
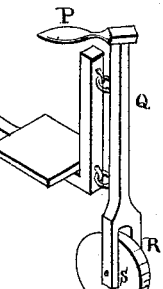
Figure 5:
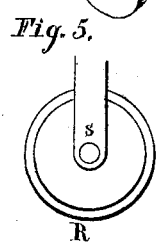
Figure 6:
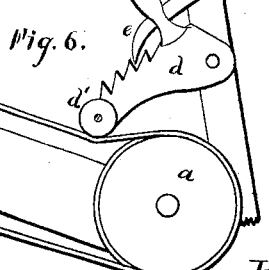

Referring to the accompanying drawings for a more complete explanation of our invention, Figure 1, Sheet 1, is a perspective view of our machine. Figs. 2, 3 are detached views of the gear. Figs. 4, 5 are detached views of the steering-wheel. Fig. 6 is a view of the belt-tightener. Fig. 7, Sheet 2, is a view of the reel-braces. Fig. 8 is a view of the draper-pulley. Fig. 9 is a view of the draper-tightener. Fig. 10 is a view of the gear-operating device. Fig. 11 is a view of the steering-handle. Fig. 12 shows the reel-belt tightener.

B is an enlarged view of the manner of securing the gear to its shaft. A is the frame of our machine, which is supported and rides upon the bearing-wheels B B'. At the front is the transverse trough C, within which the carrying belt or draper moves to carry the grain cut by the knives D to the elevator E, from which it is carried into the header-wagons, which are driven along beneath the end of the elevator in the ordinary manner. In order to strengthen the frame and prevent sagging at the ends, which is a source of trouble, we employ a set of rods, F, which are secured to the sides of the frame A, toward the ends, and cross each other over a trestle or supporting-standard, G, near the middle, as shown. Turn-buckles H serve to tighten or slacken the rods, as may be desired. In order to obviate the difficulty encountered in driving such long knives or cutters as are employed upon headers from one end, we place the lever I in the center of the machine, its front end passing beneath the carrying-belt. From its forward end a stout pin, J, extends upward, and a cap upon the back of the knife or cutter receives this pin, so that the oscillations of the lever I will operate the cutter from its center, and thus equalize the strain, especially in heavy grain, by (in effect) making two short cutters. As the stroke should be much longer when the grain is heavy than when it is light, we have made it adjustable by pivoting the lever I to the bar K. This bar has each end fitted into a slot in the transverse beams of the frame A, the slot being long enough to allow the bar K to be moved forward or backward. Keys L serve to hold the bar firmly, and these are placed either before or behind the bar, as the case may be. The pin M, about which the lever I vibrates, is also changed from one hole to the other when the bar K is moved, and this lengthens or shortens the stroke. The pole N, to which the horses are attached to drive the machine, is made adjustable by means of the perforated plates O, attached to the rear portion of the frame A, as shown, and the pole is attached to these by stout bolts entering any of the holes from the top to the bottom of the plates, as may be desired. By this arrangement we are enabled to keep the pole nearly horizontal when cutting long or short grain, and thus avoid the necessity of a heavy balancing-weight to assist in depressing the lever for the purpose of raising the cutters, this being required when the pole and frame meet at an angle upward, as this angle forms a sort of leverage, which takes considerable power to overcome, and prevents the easy working of the machine. In order to overcome the side draft or tendency of the machine to turn to one side, it has always been necessary to hold the tiller or steering-lever P to one side, and this is not convenient. We therefore secure this lever to the top of the post Q, so that it can be adjusted to one side or the other, by means of the pin and holes in the post, or equivalent device, and this allows the driver to hold it straight, and at the same time cause the wheel to run at an angle. In order to prevent the steering-wheel from slipping, it has been made heretofore either with a flat supporting-face for soft ground, or a sharp wheel has been used for hard ground; but neither wheel could be employed in all sorts of ground. We therefore construct our wheel with a sharp flange, R, in the center of the face of the wheel S, which is of considerable breadth, and has a flat face, as shown, upon which the bearing will come if the ground proves soft; but the sharp flange will always hold the wheel to its course.

We have called our machine the "single-gear header" from the fact that we employ but one gear, T, to drive all the machinery, and this gear is secured to the same shaft or axis with the bearing-wheel B, but outside of the frame, and it is so bored out that it is somewhat loose upon the shaft, and is allowed to give in case the teeth become clogged, or when the machine is strained by running upon a side hill, and thus prevent the breaking of the gear, as frequently happens when it is rigidly secured.

The method which we have adopted for securing the gear so that it will be loose and still work properly is to make a slot or keyway partly through the hub of the gear, and a stout pin is driven through the axis or shaft, and projects into this slot on each side. The shaft U lies across outside of this gear, supported by suitable boxes, and carries the pinion V, which meshes into the gear. The pinion moves on a feather, and is thrown into or out of gear by means of the rock-shaft W, with the crank-arms, as shown, and the rod X, which has a handle within easy reach of the driver. Below this handle is a bolt-like projection, which rests in a trough, X', along the side of the lever Y, and the bolt falls into a hole at either end as the pinion may be in or out of gear. A groove is turned in the hub of the pinion, and half-box Z fits into this groove from each side. A clutch-lever, Z', has its legs attached to the opposite half-boxes, and is connected with the crank of the rock-shaft to operate the pinion. A pulley, a, upon the end of the shaft U, and a pulley, b, at the upper end of the elevator, carry a belt, c, by which the draper or grain-belt shaft is driven. In order to keep the belt c tight, we employ a tightening device consisting of a pulley, d', turning in boxes upon a lever-arm, d, which is pivoted to a post on the machine. Just above the arm d is a pawl, e, also attached to the post, and this pawl falls into the teeth upon the back of the lever d, and holds it down, so that the pulley presses, more or less, upon the belt. The rollers or shaft f of the carrying-belt are flanged at each end to prevent the belt from running off. The boxes g of the shaft f, at the end of the machine opposite to the elevator, are made to move in guides or grooves, and are operated by screws g', by which the carrying-belt can always be kept tight. The reel h is driven by a belt from the pulley i upon the axle of the wheel B', the belt passing over the pulley j upon the reel-shaft. In order to regulate the tightness of this belt the reel-shaft passes through a box, k, which is made movable upon its supporting-arm i'. A screw, m, suitably operated, serves to move the box, and thus tighten the belt. The reel is braced and made stiff by means of the rods n, which extend from the arms n' at each end to the central arms O', and can be made tight at will by nut at each end.

As most of the weight of the machine and the draft is upon the side of the gear and elevator, the tongue will be set nearer to that side. We also place the wheel B' considerably nearer to the center of the machine, thus avoiding much of the strain caused by the long frame supported at its ends.

A turn-table or metal plate may be placed at the point where the lever I rests upon the bar K, to prevent wear. The pitman q extends from the end of the lever I to the crank-wheel r, as shown, and passes through a slot in one of the plates O. The lever Y is secured to the two standards s and t at the front and back of the frame A. The standard t is inclined toward the center, so that the point of action of the lever will be nearer together, and the standards have holes, so that the end of the lever Y may be elevated or depressed for convenience when the tongue is moved up or down by means of the perforated plates O. The lever Y may have a false handle, for greater convenience in operating.

Having thus described our invention, what we claim, and desire to secure by Letters Patent, is—

1. The perforated or slotted plates O, secured to the rear part of the frame A, and serving to attach the tongue N at different elevations, in order to preserve its position parallel to the ground when the cutting apparatus is set to cut high or low, as herein described and shown.

2. The pinion V, box Z, clutch-lever Z', and rock-shaft W, with its arms, in combination with the rod X, having a projecting bolt working in the trough X', with a perforated bottom, substantially as and for the purpose described.

3. In combination with the tongue or pole N, made adjustable by means of the perforated plates O, the operating-lever Y, adjustably mounted upon the standards s and t, the rod X, and the trough X', substantially as and for the purpose described.

In witness whereof we hereunto set our hands and seals.

JOSHUA BERTRAM WEBSTER. [L. S.]
  WILLIAM A. DORR. [L. S.]
  MARTIN McCLENATHAN. [L. S.]

Witnesses:
  SAML. C. BATES,
  JAS. H. BUDD.